(12) United States Patent
Seo et al.

(10) Patent No.: US 11,203,364 B2
(45) Date of Patent: Dec. 21, 2021

(54) BOGIE STRUCTURE FOR MOUNTAIN RAILWAY CAR

(71) Applicant: KOREA RAILROAD RESEARCH INSTITUTE, Uiwang-si (KR)

(72) Inventors: Sung-Il Seo, Seoul (KR); Hyung-Suk Mun, Seoul (KR)

(73) Assignee: Korea Railroad Research Institute, Uiwang-si (KR)

( * ) Notice: Subject to any disclaimer, the term of this patent is extended or adjusted under 35 U.S.C. 154(b) by 278 days.

(21) Appl. No.: 16/334,553

(22) PCT Filed: Jun. 22, 2017

(86) PCT No.: PCT/KR2017/006567
§ 371 (c)(1),
(2) Date: Mar. 19, 2019

(87) PCT Pub. No.: WO2018/074695
PCT Pub. Date: Apr. 26, 2018

(65) Prior Publication Data
US 2020/0398873 A1 Dec. 24, 2020

(30) Foreign Application Priority Data
Oct. 20, 2016 (KR) .......................... 10-2016-0136397

(51) Int. Cl.
*B61F 3/04* (2006.01)
*B61C 9/50* (2006.01)
(Continued)

(52) U.S. Cl.
CPC .................. *B61F 3/04* (2013.01); *B61C 9/50* (2013.01); *B60L 2200/26* (2013.01); *B61C 3/00* (2013.01); *B61F 5/52* (2013.01); *B61F 15/12* (2013.01)

(58) Field of Classification Search
CPC ...... B61F 3/00; B61F 3/02; B61F 3/04; B61F 3/08; B61F 3/16; B61H 1/00; B61H 3/00; B61H 9/00; B61H 9/006; B61H 13/00
See application file for complete search history.

(56) References Cited

U.S. PATENT DOCUMENTS

| | | | | |
|---|---|---|---|---|
| 4,170,945 A | * | 10/1979 | Kayserling | ............... B61C 9/44 105/131 |
| 2004/0123767 A1 | * | 7/2004 | Nishimura | ................ B61F 5/52 105/157.1 |
| 2006/0175158 A1 | * | 8/2006 | Zhang | ...................... B61H 1/00 188/218 R |

FOREIGN PATENT DOCUMENTS

| | | |
|---|---|---|
| EP | 1197412 A2 | 4/2002 |
| EP | 2386454 A1 | 11/2011 |

(Continued)

*Primary Examiner* — Robert J McCarry, Jr.
(74) *Attorney, Agent, or Firm* — Rabin & Berdo, P.C.

(57) ABSTRACT

The present invention relates to a bogie structure for a mountain railway car. The bogie structure is configured as follows: a traction motor for driving an axle of mountain railway car is installed on a car body to simplify the bogie structure and to minimized interference between the traction motor and other components constituting the bogie, and a first and a second bearing are respectively inserted and installed between a first and a second axle and a first and a second wheel, so that a first and a second wheel located in one side close to a turning center are rotated less than a first and a second wheel located in the other side opposite thereof and a traveling distance of the wheels located in the turning-centered side is generated corresponding to a length of a turning-centered side railway, whereby the mountain railway car is improved in traveling stability.

4 Claims, 5 Drawing Sheets

(51) Int. Cl.
    *B61C 3/00*          (2006.01)
    *B61F 5/52*          (2006.01)
    *B61F 15/12*        (2006.01)

(56) References Cited

FOREIGN PATENT DOCUMENTS

| | | |
|---|---|---|
| KR | 20-1989-0013121 U | 8/1989 |
| KR | 20-0362089 Y1 | 9/2004 |
| KR | 10-1098524 B1 | 12/2011 |
| KR | 10-1463796 B1 | 11/2014 |
| KR | 10-2015-0004447 A | 1/2015 |

\* cited by examiner

BOGIE STRUCTURE FOR MOUNTAIN RAILWAY CAR

TECHNICAL FIELD

The present invention relates to a bogie structure for a mountain railway car and, more particularly, to a bogie structure for a mountain railway car, which minimizes interference between a traction motor for driving an axle of the mountain railway car and other components and is improved in traveling stability during traveling on a travel route in which a steep grade exists, such as in a mountainous area.

BACKGROUND ART

Generally, the importance of a railway car as a large transport vehicle has increased as the number of people using such a railway car has gradually increased, thus in the Republic of Korea for example, a nationwide network of railways is being constructed and operated. According to the quantitative expansion of such railway, users of the railway are demanding improvement of qualitative service such as performance, stability, comfort, and advancement of technology.

Meanwhile, depending on the topographical characteristics of Korea, which has many mountainous areas, the railway car frequently encounters sloped areas, and in these areas, a railway car with a special structure is operated.

A mountain railway car is a vehicle that mainly travels on steep hills, and should be more stable than a general railway car. Accordingly, railway structures to secure the traveling stability of the railway car during traveling on steep slope sections have been disclosed in Korean Utility Model Registration No. 20-0362089 (Patent Document 1), Korean Patent No. 10-1098524 (Patent Document 2).

In these documents, a pinion gear and a rack gear may be respectively provided on the mountain railway car and the ground to provide traveling force during traveling uphill, and to provide braking force during traveling downhill. For example, the pinion gear may be installed on the center of an axle of the railway car while wheels are placed on opposite sides thereof, and the rack gear may be installed on the center of a track and engage the pinion gear.

Generally, bogies for the mountain railway car are divided into: a bogie with an indirect drive type traction motor that drives a drive shaft of a wheel by a power transmission device, and a bogie with a direct drive type traction motor that directly drives the drive shaft by coupling with the drive shaft of the wheel.

However, since the mountain railway car travels a relatively large number of turn sections, slope sections and turn-and-slope sections as compared with a general railway car, an additional configuration including the pinion gear engaging the rack gear mentioned in the bogie structure of the general railway car should be installed on the mountain railway car for more stable traveling. For this reason, it is difficult to use the bogie with the direct drive type traction motor.

Accordingly, it is urgent to develop a bogie that may be applied to the mountain railway car having a travel route with steep grade like a mountain railway.

DISCLOSURE

Technical Problem

Accordingly, the present invention has been made keeping in mind the above problems occurring in the prior art, and an object of the present invention is to provide a bogie structure for a mountain railway car, in which a traction motor that drives an axle to provide traveling force during traveling up on a traveling route having a steep grade such as in a mountain railway is installed at a distance from the axle, thereby reducing interference between the traction motor and other components constituting the bogie such as a pinion gear.

Another object of the present invention is to provide a bogie structure for a mountain railway car, in which a bearing is inserted and installed inside a wheel constituting the bogie of the mountain railway car to allow the wheel to be rotated independently regarding rotation of an axle, so that the mountain railway car is improved in traveling stability on the traveling route having the steep grade such as in the mountain railway.

Technical Solution

In order to accomplish the above object, the present invention provides a bogie structure for a mountain railway car.

The bogie structure for the mountain railway car includes: a bogie frame provided on a lower part of a car body of the mountain railway car and supporting a load of the car body; a first and a second wheelset provided on a lower part of the bogie frame and configured such that first and second wheels are respectively provided on opposite sides of a first and a second axle; a pinion gear coupled to the first axle; a traction motor provided on the car body and generating driving force; and a drive gear coupled to the first axle to transmit the driving force of the traction motor to the first axle.

Here, the pinion gear may be provided on the center of the first axle.

In addition, with the pinion gear as the center, a disc brake type braking device may be provided on a first side of the first axle, and a drum brake type braking device may be provided on a second side thereof.

A pair of disc brake type braking devices may be provided on opposite sides of the second axle.

A first and a second bearing may be respectively inserted and installed between the first and the second axle and the first and the second wheels of the first and the second wheelset.

Advantageous Effects

As described above, the present invention provides a feature in which a traction motor that drives an axle of the mountain railway car for traveling up on a steep slope of a mountainous area is installed on a car body thereby simplifying a structure of a bogie. Therefore, space utilization of a bogie frame is improved and interference between the traction motor and other components is minimized.

In addition, according to the present invention, a first and a second bearing are respectively inserted and installed between a first and a second axle and a first and a second wheel which are provided on a lower part of the bogie frame. Therefore, the first and the second axle and the first and the second wheel are independently rotated, whereby traveling stability on a curved section is improved.

BEST MODE

Figure 1:
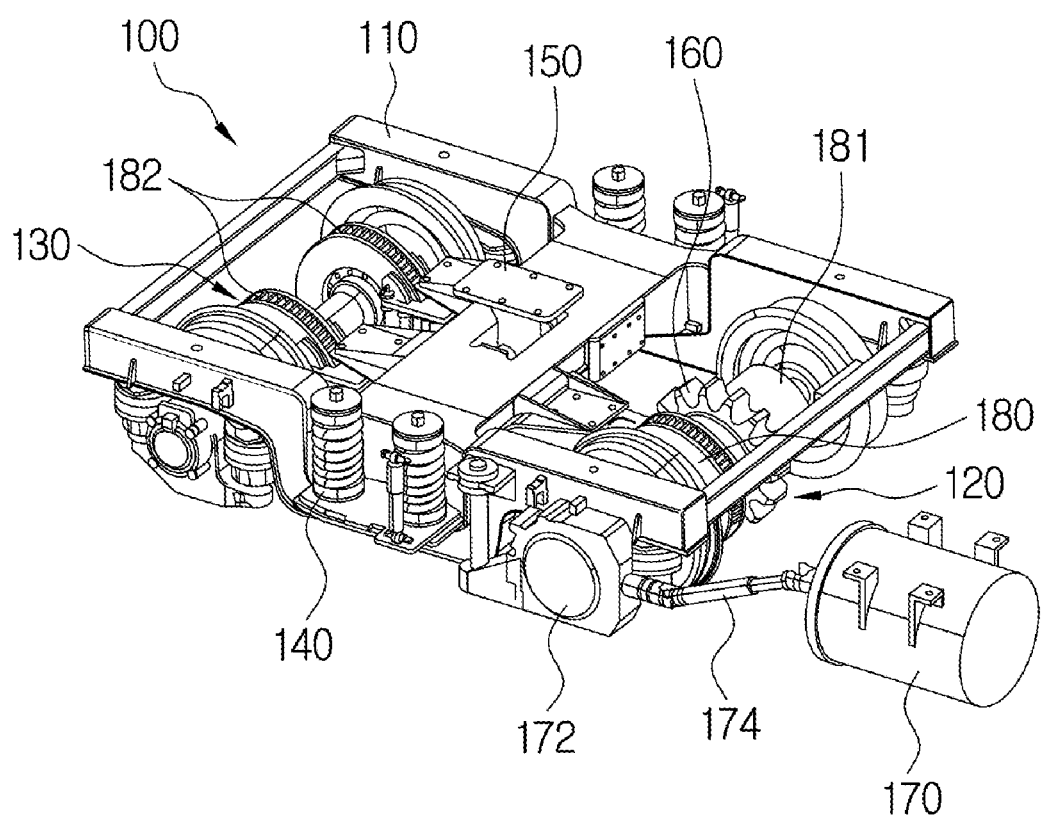
FIG. 1 is a perspective view showing a bogie for a mountain railway car according to the present invention.
Figure 2:
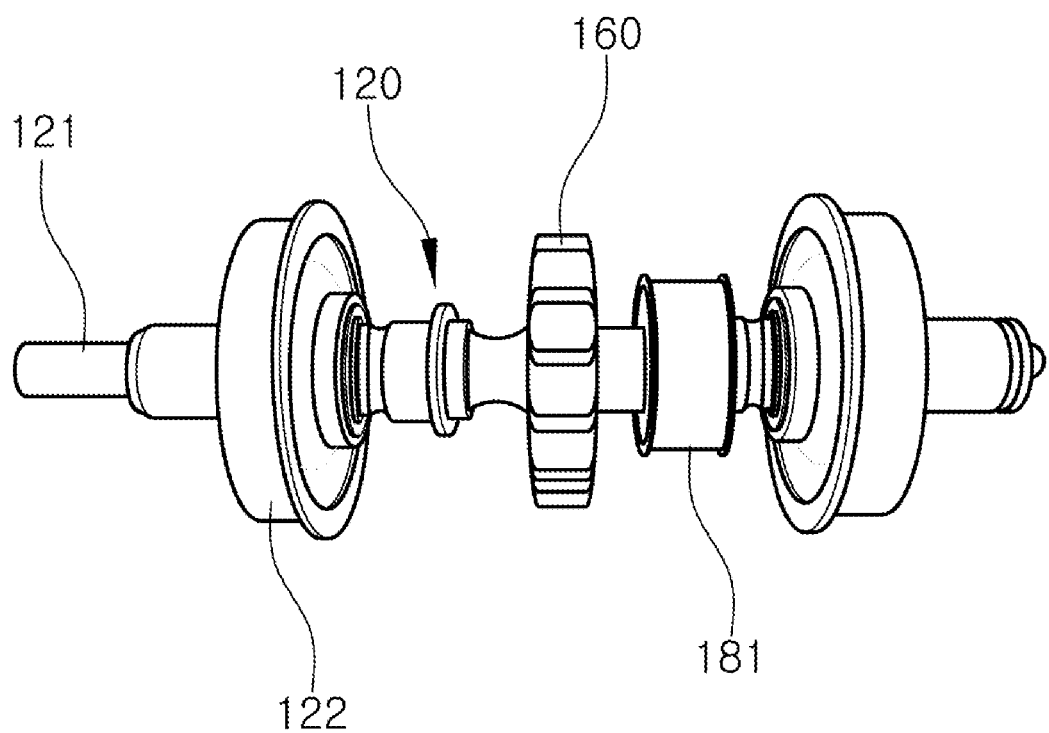
FIG. 2 is a view showing a first wheelset according to the present invention, which the first wheelset constitutes the bogie for the mountain railway car and functions as a drive axle.
Figure 3:
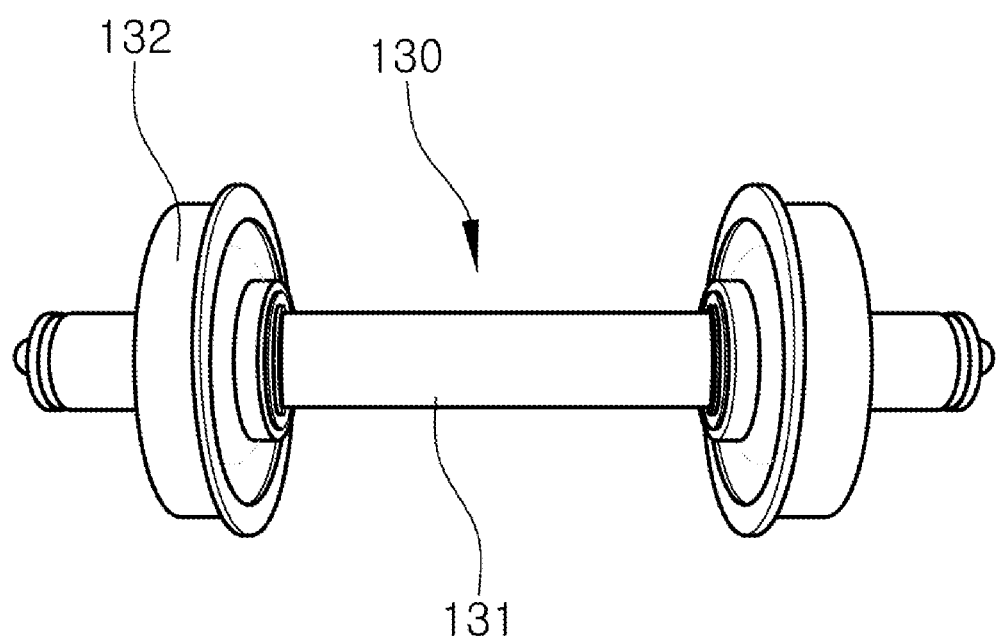
FIG. 3 is a view showing a second wheelset according to the present invention, which the second wheelset constitutes the bogie for the mountain railway car and functions as a driven axle.
Figure 4:
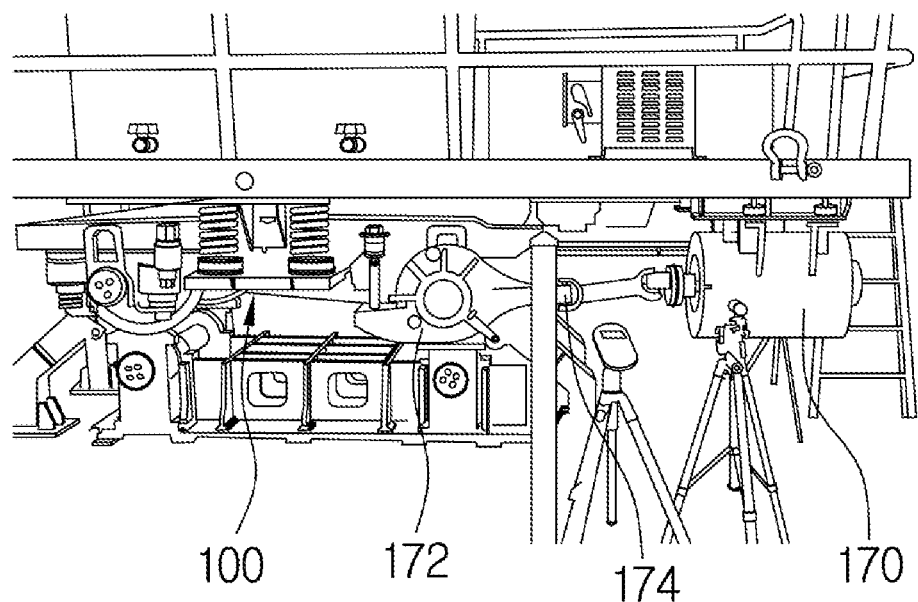
FIG. 4 is a view showing a test example of the bogie for the mountain railway car according to the present invention.

Hereinafter, features of a bogie structure for a mountain railway car according to the present invention will be understood from an embodiment described in detail with reference to the accompanying drawings All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Specific structural and functional descriptions of embodiments of the present invention disclosed herein are only for illustrative purposes of the preferred embodiments of the present invention, and the present description is not intended to represent all of the technical spirit of the present invention. On the contrary, the present invention is intended to cover not only the exemplary embodiments, but also various alternatives, modifications, equivalents and other embodiments that may be included within the spirit and scope of the present invention as defined by the appended claims.

Referring to FIGS. 1 to 5, a bogie for a mountain railway car according to the present invention has following features, a traction motor for rotating an axle is installed separately from a bogie frame to improve space utilization of the bogie frame, and bearings are inserted and installed between portions in which axles and wheels are coupled to allow the axles and wheels to be independently rotated, so that the mountain railway car is improved in traveling stability when traveling on a curved section.

Such a bogie for the mountain railway car 100 according to the present invention includes: the bogie frame 110 provided on a lower part of a car body and supporting load of the car body; a first and a second wheelset 120 and 130 provided on a lower part of the bogie frame 110 and configured such that first and second wheels 122 and 132 are respectively provided on opposite sides of a first and a second axle 121 and 131; a suspension device 140 reducing vibration transmitted from the first and the second wheelset 120 and 130; a center pivot 150 installed on the center of the bogie frame 110 for transmitting traction force between the bogie 100 and the car body; a braking means coupled to the first and the second axle 121 and 131; a pinion gear 160 that engages a rack gear (not shown) coupled to the first axle 121 thereby being installed on a railway, the traction motor 170 generating driving force of the first axle 121; and a drive gear 172 coupled to the first axle 121 to transmit the driving force of the traction motor 170 to the first axle 121.

The driving force generated by driving of the traction motor 170 is transmitted to the drive gear 172 to rotate the first axle 121, so that the drive gear engages the rack gear during traveling up a steep slope of a mountainous are thereby pulling the mountain railway car.

In the bogie 100, the bearings are inserted therein to support journal parts that are located at opposite ends of the first and the second axle 121 and 131 and to be rotatable, a front and a back axle box are provided to support the bogie frame 110, and the suspension device 140 is installed between the bogie frame 110 and the axle box to reduce vibration.

Here, a configuration of the bogie frame 110, the suspension device 140 and the center pivot 150 is the same as that applied to a conventional general bogie, so a detailed description thereof will be omitted.

Hereinbelow, each of partial-configurations of the present invention will be described in detail.

Referring to FIGS. 1 to 4, a pair of the first and the second wheelset 120 and 130 provided on the lower part of the bogie frame 110 is configured such that the first wheelset 120 is connected to and provided with the traction motor 170 to function as a driving axle, and the second wheelset 130 functions as a driven axle without a separate traction means.

Here, a pair of first wheels 122 is provided on the opposite sides of the first axle 121 of the first wheelset 120, and a pair of second wheels 132 is provided on the second axle 131 of the second wheelset 130 as well. A braking device is provided on each of the first and the second wheelset 120 and 130, and the pinion gear 160 is provided on the center of the first axle 121 of the first wheelset 120 functioning as the driving axle.

In addition, with the pinion gear 160 as the center, the braking device is configured of a disc brake type braking device 180 installed on a first side of the center, and a drum brake type braking device 181 installed on a second side thereof. In the second wheelset 130 functioning as the driven axle, a pair of disc brake type the braking devices 182 is installed on opposite sides of the center of the second axle 131.

In addition, the drive gear 172 is coupled to a first side end of the first axle 131, and is connected to and installed on the traction motor 170 by a link member 174, which the traction motor 170 is fixed to the car body at a distance from the bogie frame 110.

That is, the traction motor 170 is fixed to an underframe (not shown) of the car body that is installed on a upper part of the bogie 100 so as to be spaced apart from the bogie frame 110 at a predetermined distance, and connected to the drive gear 172 by the link member 174. Consequently, the bogie structure for the mountain railway car is simplified and no interference occurs between other components of the bogie 100 and the traction motor 170.

The drive gear 172 may be directly coupled to the first axle 121, but may be provided on an end of the link member 174 as needed. Further, a driven gear (not shown) engaging the drive gear 172 may be installed as a coupled structure to the first axle 121.

Figure 5:
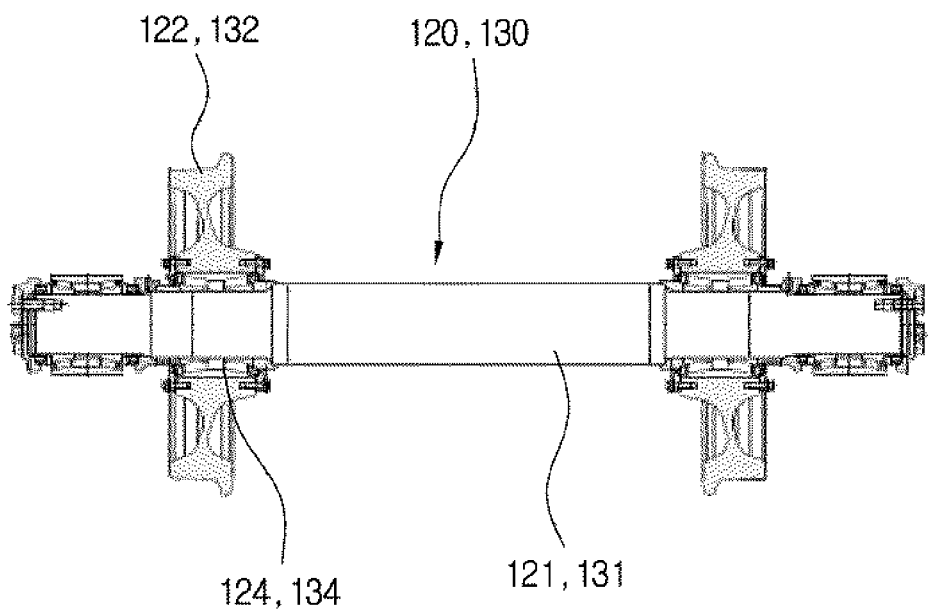
FIG. 5 is a front view showing the first and the second wheelset constituting the bogie for the mountain railway car according to the present invention.

Meanwhile, the first and the second wheelset 120 and 130 are configured as shown in FIG. 5. A first and a second bearing 124 and 134 are inserted and installed between the first and the second axle 121 and 131 and the first and the second wheels 122 and 132, and the first and the second bearing 124 and 134 function to enable the first and the second axle 121 and 131 and the first and the second wheels 122 and 132 to be driven independently.

That is, the mountain railway car frequently encounters a travel route in which a steep grade is formed during traveling. However, during driving on a curved railway, when the first and the second axle 121 and 131 and the first and the second wheels 122 and 132 are integrally coupled to each other and rotate together, a first and a second wheel 122 and 132 located in one side close to a turning center and a first and a second wheel 122 and 132 located at the other side opposite thereto have the same rotating amount and are moved by the same distance. Therefore, force for moving the mountain railway car in a straight direction, that is, force for moving mountain railway car in a tangential direction from the center of rotation is generated, and when the force is added to centrifugal force generated when the mountain railway car travels on the curved railway, large load may be generated on the car body, and an accident such as breakaway from railways may occur.

Accordingly, in the present invention, as the first and the second bearing 124 and 134 are respectively inserted and installed between the first and the second axle 121 and 131 and the first and the second wheels 122 and 132, the first and the second wheels 122 and 132 may be independently rotated without rotation of the first and the second axle 121 and 131, and the first and the second wheels 122 and 132 located in the turning-centered side and the first and the second wheels 122 and 132 located at the side opposite thereto may have different rotating amounts from each other when the mountain railway car travels on the curved railway.

Through such a structure, when the mountain railway car travels on a curved railway, the first and the second wheels 122 and 132 located in the turning-centered side are rotated less than the first and the second wheels 122 and 132 located at the side opposite thereto. Therefore, travel distance of the first and the second wheels 122 and 132 located in the turning-centered side is generated corresponding to the length of a turning-centered-side railway, so that traveling stability of the mountain railway car may be improved.

Hereinbelow, an example of driving the bogie for the mountain railway car according to the present invention detail is described with reference to FIGS. 1 to 5.

First, the traction motor 170 is driven when the mountain railway car travels up on the steep slope of the mountainous area. Thus, the driving force generated thereby is generated, and the driving force, i.e. rotation force, is transmitted to the link member 174, and the link member 174 rotates the drive gear 172 coupled to the first axle 121 of the first wheelset 120 performing the drive axle. Accordingly, the first axle 121 rotates the pinion gear 160 coupled to the first axle 121 while being rotated and engages the rack gear installed on the railway, whereby the mountain railway car is pulled.

In addition, when the mountain railway car travels down on the steep slope of the mountainous area, the disc brake type the braking device 180 and the drum brake type the braking device 181, which are installed on the first axle 121 of the first wheelset 120 functioning as the drive axle, and the pair of the disc brake type the braking device 182 that is installed on the second axle 131 of the second wheelset 130 functioning as the driven axle are driven to perform braking of the mountain railway car.

Meanwhile, when the mountain railway car travels on the curved railway, since the first and the second bearing 124 and 134 are respectively inserted and installed between the first and the second axle 121 and 131 and the first and the second wheels 122 and 132, the first and the second wheels 122 and 132 located in the turning-centered side are rotated less than the first and the second wheels 122 and 132 at the side opposite thereto to have the travel distance corresponding to the railway, so that the traveling stability of the mountain railway car is improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a bogie structure for the mountain railway car and, more particularly, to a bogie structure for the mountain railway car that can minimize the interference between the traction motor for driving the axle of the mountain railway car and the other components, and improve the traveling stability of the mountain railway car during traveling on a travel route having the steep slope such as in a mountainous area.

What is claimed is:

1. A bogie structure for a mountain railway car, the bogie structure comprising:
    a bogie frame provided on the mountain railway car;
    a first wheelset provided on the bogie frame and including first wheels and a first axle, the first wheels provided on opposite sides of the first axle;
    a second wheelset provided on the bogie frame and including second wheels and a second axle, the second wheels provided on opposite sides of the second axle;
    a pinion gear coupled to the first axle;
    a traction motor provided on the mountain railway car and generating driving force; and
    a drive gear coupled to the first axle to transmit the driving force of the traction motor to the first axle,
    wherein the pinion gear is provided at the center of the first axle,
    wherein a pair of first braking devices is provided on the opposite sides of the second axle, and the first braking devices include disc brakes,
    wherein a first bearing is inserted and installed between the first axle and the first wheels of the first wheelset, and
    wherein a second bearing is inserted and installed between the second axle and the second wheels of the second wheelset.

2. The bogie structure of claim 1, wherein, with the pinion gear at the center, a second braking device including a disc brake is provided on a first side of the first axle and a drum brake type braking device including a drum brake is provided on a second side thereof.

3. A bogie structure for a mountain railway car, the bogie structure comprising:
    a bogie frame provided on the mountain railway car;
    a first wheelset provided on the bogie frame and including first wheels and a first axle, the first wheels provided on opposite sides of the first axle;
    a second wheelset provided on the bogie frame and including second wheels and a second axle, the second wheels provided on opposite sides of the second axle;
    a pinion gear coupled to the first axle;
    a traction motor provided on the mountain railway car and generating driving force; and
    a drive gear coupled to the first axle to transmit the driving force of the traction motor to the first axle,
    wherein a first bearing is inserted and installed between the first axle and the first wheels of the first wheelset, and wherein a second bearing is inserted and installed between the second axle and the second wheels of the second wheelset.

4. A bogie structure for a mountain railway car, the bogie structure comprising:
- a bogie frame provided on the mountain railway car;
- a first wheelset provided on the bogie frame and including first wheels and a first axle, the first wheels provided on opposite sides of the first axle;
- a second wheelset provided on the bogie frame and including second wheels and a second axle, the second wheels provided on opposite sides of the second axle;
- a pinion gear coupled to the first axle;
- a traction motor provided on the mountain railway car and generating driving force; and
- a drive gear coupled to the first axle to transmit the driving force of the traction motor to the first axle,
- wherein the pinion gear is provided at the center of the first axle.

\* \* \* \* \*